Sept. 25, 1928.  H. H. LINN  1,685,676
TRACTOR
Filed May 13, 1924  7 Sheets-Sheet 1

Inventor
HOLMAN H. LINN,
By Jas. A. Richmond
Attorney

Sept. 25, 1928.  H. H. LINN  1,685,676
TRACTOR
Filed May 13, 1924 7 Sheets-Sheet 4

Inventor
HOLMAN H. LINN,
By Jack Richmond
Attorney

Patented Sept. 25, 1928.

1,685,676

UNITED STATES PATENT OFFICE.

HOLMAN HARRY LINN, OF MORRIS, NEW YORK, ASSIGNOR TO THE LINN MANUFACTURING CORPORATION, OF MORRIS, NEW YORK, A CORPORATION OF NEW YORK.

TRACTOR.

Application filed May 13, 1924. Serial No. 713,022.

The invention is more particularly addressed to tractors of the heavy hauling type, embodying front steering wheels or sleds and rear traction elements of the track-laying type. A tractor of this nature is disclosed in Letters Patent 1,270,531, granted to Holman Harry Linn, June 25, 1918.

To adapt the track-laying tractor to commercial hauling, two major shortcomings of the general-utility type must be eliminated, namely, the loss of traction under various circumstances; and, the element of risk attendant upon hauling downgrade or upon backing-up.

Traction may be lost and the load thereby stalled, under the following circumstances:

1. When the pull is heavy, the tractor lifts at the front and rides only upon the rear part of its tracks; tractive area is thereby reduced, the tracks slip and the machine is not propelled.

2. The condition of the ground being conducive to slipping of the tracks and no convenient control of traction being provided, the tracks slip for want of sufficient pressure of the tracks upon the ground and consequently the load stalls.

3. The surface of the ground being uneven or covered with rocks, logs, or other obstructions, the tracks lose contact throughout the greater part of their length; tractive area being thereby reduced, the tracks slip and stall the load.

4. When the inside track is declutched on a sharp turn, the full power is thrown on the outside track; this slips, being only one-half of the normal tractive area, and the load stalls.

The solution of problem 1 requires not only a traction member of such flexibility that it will keep the track on the ground even though the torque tends to lift the front of the machine, but also depends on a heavy weight carried far in advance of the track, and which, through the great leverage afforded, will make it impossible for the track to lose its bearing on the ground. The logical weight to carry forward is the power plant. This places the motor, radiator, clutch, transmission and controls in positions of convenience and accessibility. It further admits of their protection from excessive vibration through the medium of suitable springs and rubber tires.

The solution of problem 2 is simplified by the preceding disposition. Since traction is dependent not only upon the area of ground contact of the tracks, but equally upon the pressure of the tracks on the ground, it follows that increasing the weight on the tracks increases their tractive effect. The logical weight to carry over the tracks, in the space left clear by the removal of the power plant, etc., is pay load. Such load (or dead weight when more convenient) can be varied as occasion requires. This makes it possible to eliminate all dead weight in the design of the machine, thus economizing in fuel consumption and general wear and tear when the machine is running light.

The solution of problem 3 presupposes the achievement of a traction member of such flexibility that it will maintain normal contact with very uneven ground. This involves a departure from customary practice, but, in the case of the inventive concept hereinafter described, results not only in a completely flexible unit, but one in which weight-carrying axles and axle bearings are eliminated. The importance of getting rid of these delicate parts in a unit which, of necessity, works most of the time in mud, sand and water is manifest.

Problem 4 can be solved practically only by doing away with track steerage. By using conventional wheel steerage (made possible by the long chassis evolved in the solution of problem 1), full power may be applied to both tracks under all conditions through the customary differential gear. In the automotive field the differential is practically a perfected mechanism, being less likely to give trouble than almost any other part of the machine. The elimination of track steerage means getting rid of a clutch and brake on each track and the separate controls for each of them. It does away with the wear and tear dependent upon them and the maintenance they require.

Finally, there is the question of risk attendant upon hauling down grade or upon backing up. It is a concomitant of track steerage. This form of steerage requires that whenever the tractor is backing up or whenever it is holding back a load on a down grade, the controls must be operated the opposite of normal. In normal driving, if the machine starts to veer off the road to the right, the driver turns his controls to the left and the machine resumes its proper course. But, if the machine veers to the right on a down grade, the driver must turn his controls to the right as though to turn the machine further off the road. If he forgets, or makes a slip in a moment of excitement and turns his controls the natural way, the machine will run off the road. Precisely the same thing is true when backing the machine. The fact that the driver has to remember on each down grade to work his controls "the wrong way", so to speak, constitutes a real menace when a heavy load is coasting fast down grade; if the driver, in a forgetful moment, or from force of habit, operates the controls in the normal manner, the machine and load will leave the road. It is particularly difficult for a driver to keep his head on a rolling down grade where the tractor is first holding back the load, then pulling it, and so on. Each time the load changes from a pull to a push and vice versa the driver must change his method of operation. The replacement of track steerage with wheel steerage does away with the danger of handling loads on down grades because, as is well known from car and truck driving, wheel steerage works the same way under all conditions.

The propositions stated are the result of actual demonstration over all sorts of terrain, from the ice and snow conditions of the north woods, the heavy sands of desert regions, the emulsified soil of the oil fields, and over the ground peculiar to mining districts, sugar and rice plantations.

With the foregoing in mind, and retaining the general principle of the tractor of my former patent, the objects of the present invention are to provide a load carrying and hauling machine capable of successfully meeting the most difficult hauling conditions, including the hauling of trains of sleds, semi-trailers and four-wheel trailers; to provide a machine adapted for heavy hauling, and to provide other novel features as hereinafter described and finally claimed.

The invention is illustrated in the accompanying drawings, in which.

The present invention is directed primarily to a heavy-hauling severe service tractor of the self-laying track type, and the vehicle details, aside from the means employed to secure maximum traction efficiency, may be of any approved type. For the purposes of the present invention, such details, shown more particularly in Fig. 1, may be summarized as a main frame 1, having front wheels or steering supports 2, steering mechanism 3, transmission 4, drive shaft 5, universals 6, and differential 7. As indicated, there is an unusually long wheel base, with the power plant well forward, the tracks at the rear, and a platform or clear space over the tracks for variable loading to insure the necessary pressure on the tracks.

The main frame 1 is provided throughout the rear extension thereof with auxiliary frame bars 8, secured in spaced parallel relation to the main frame bars by cross bars 9. Hangers 10 secured to the auxiliary and main frame bars, accommodate a transverse shaft 11, the ends of which form pivotal or trunnion mountings for load transferring elements or rocker beams 12. The rocker beams 12, shown more particularly in Figs. 4 to 7 inclusive, comprise open triangular castings, with bearing sleeves 13 at the apex to engage the shaft 11, and spaced depending base connected walls 14. The bases of the walls 14 have lateral extensions or ledges 15, brace ribs 16 being provided to strengthen the structure as a whole. The bearing sleeves take the full portions of the shaft 11 between the main and auxiliary frame bars, so that the rocker beams are adapted for full pivotal or swinging movement while being held against lateral movement. It will be noted that the axis of the shaft securing element or sleeve 13 of the rocker beam is located rearwardly of a line dividing the rocker beam fore and aft. This results in a differential bottom bearing area, the fore extension exceeding in area the bearing area of the aft extension. This is of importance in considering the relation of the runner blocks which absorb and transmit all load and other stresses imposed upon the rocker beam. The ledges 15 have notched or arcuate depressions 17, there being a plurality of such depressions in the fore extension to provide for relative adjustment of the front runner block. The described notches or depressions constitute half caps or bearings for the trunnion or pivotal elements 18 of a complemental set of runner blocks 19, which support the rocker beam fore and aft. Evidently, this construction and assembly admits of vertical swinging movement only.

The runner blocks 19, shown more particularly in Figs. 8 to 11, inclusive, are arranged in pairs in tandem fashion for each rocker beam, with their opposed inner ends immediately adjacent or lapping and their outer ends well beyond the ends of the rocker beam. The runner blocks are of substantially triangular form in side elevation, with their ends rounded and their upper surfaces downwardly inclined. In short, the apices of the runner blocks are in confronting or overlapping relation. The elements or pintles 18 of the runner blocks project laterally from hub formations 20 thereof, the arrangement being such that when the runner blocks are juxtaposed with relation to the forked ends of the rocker beam, the pintles 18 are accommodated in the proper depressions or bearing cavities of the rocker beam and are properly retained by straps or U bolts 21, penetrating vertical openings 22, in the rocker beam.

Figure 9:
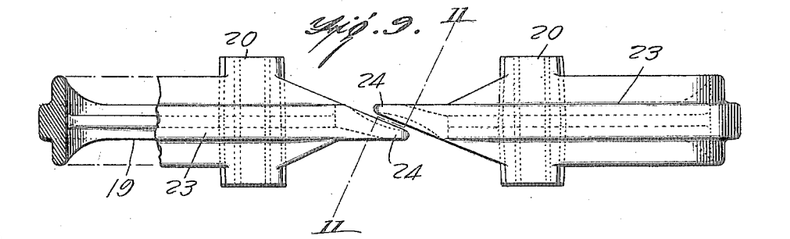
Fig. 9 is a bottom plan of the same.
Figure 10:
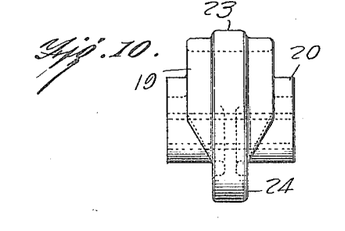
Fig. 10 is an end view of one of the runner blocks.
Figure 11:
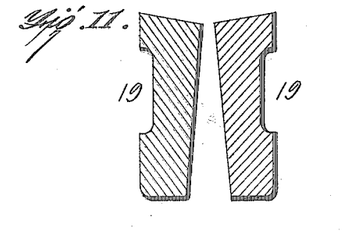
Fig. 11 is a section on line 11—11 of Fig. 9.

The substantially straight bottom walls of the runner blocks are formed with a central longitudinally disposed rib or rail 23 continued at the rounded ends of the blocks and finally vanishing in the body thereof, the downwardly inclined or converging upper walls of the blocks presenting substantially intact or plane surfaces. There is thus provided a differential roller path for the rollers which transfer the load and other stresses from the runner blocks to the tracks. The provision of a plurality of half caps or bearings, that is to say, the arcuate depressions 17, in the fore extension of the rocker beam obviously admits of endwise adjustment of the forward runner block with relation to its mate in order to adjust the chain of rollers in accordance with fit and wear. It is important that the roller path represented by the rail or rib 23 be maintained throughout the lower extremities of both runner blocks. Hence, there is a rib extension 24 on the opposed ends of the runner blocks, so that at this point, and for all relative adjustments, the ribs of the cooperating runner blocks will overlap. Throughout the extended lengths of the ribs 23, they are relatively inclined in plan and slightly divergent in vertical direction toward the bottom, as shown in Figs. 9 and 11. This arrangement provides a substantially unbroken or continuous roller path of uniform width in the lapped ends of the runner blocks, notwithstanding their longitudinal adjustment. The tapered nose construction also provides for articulation of the confronting portions of the runner blocks under varying conditions of terrain.

A roller chain 25 is adapted and arranged for travel over the described differential roller path of the runner blocks, to eliminate friction between the runner blocks and the tracks. The roller chain is of unique and peculiar form in that the rollers are of the flanged or spool type to provide a reduced annular surface for cooperation with the rail 23 of the runner blocks, and relatively enlarged annular bearing surfaces for cooperation with other parts of the runner blocks and the tracks or lag-beds. The effect and merit of this is to make the rollers independent of the speed of the track and to relieve the axles or spindles of the rollers of load thrusts, thereby ensuring maximum roller bearing efficiency. It further results in increased life and economy through the obviously reduced speed of the rollers.

Figure 12:
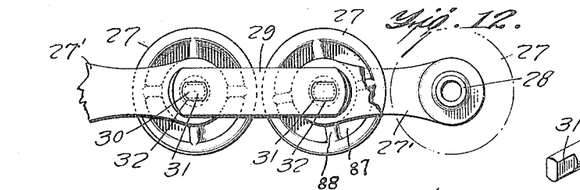
Fig. 12 is an elevational view of a section of the roller assembly.
Figure 13:
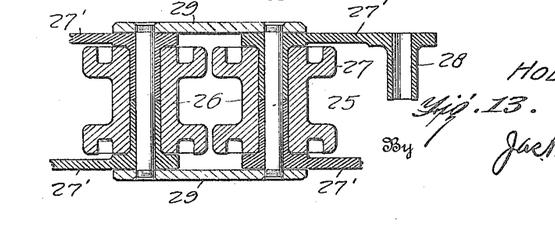
Fig. 13 is a sectional view thereof.

The roller chain, shown more particularly in Figs. 12 and 13, is made up of rollers of the spool type connected in pairs, each roller comprising a hollow spindle 26 and end flanges 27, whereof the spindle cooperates with the rib 23 and the flanges with the tracks and with unribbed portions of the runner blocks.

Figure 14:
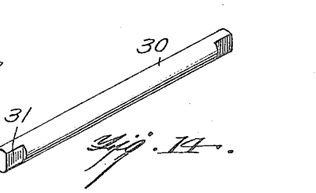
Fig. 14 is a perspective view of one of the journal pins for the rollers of the roller assembly.
Figure 15:
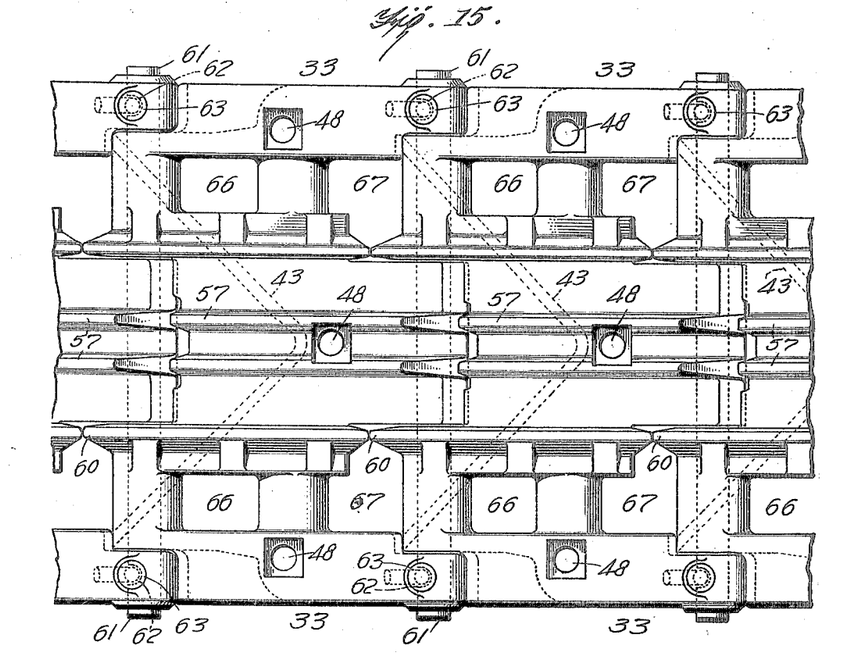
Fig. 15 is a plan view of connected track or lag plates.
Figure 16:
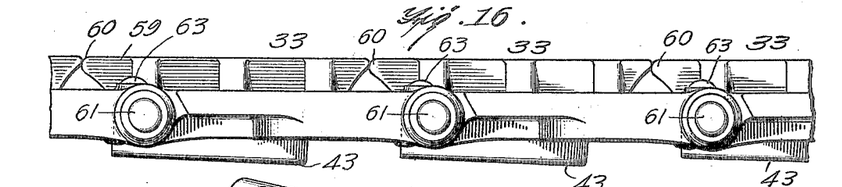
Fig. 16 is a side elevation of the same.

The rollers are connected by side bars 27, having integral half bushings 28 adapted for reception of the spindles of the rollers. Connecting links 29 connect adjacent rollers of respective pairs, through the medium of pins 30, passing through the bushings 28 and links 29, and terminally upset beyond the latter, as clearly shown in Fig. 13. The ends of the pins, Fig. 14, have flat faces 31, to engage corresponding slots 32 in the connecting links.

Figure 19:
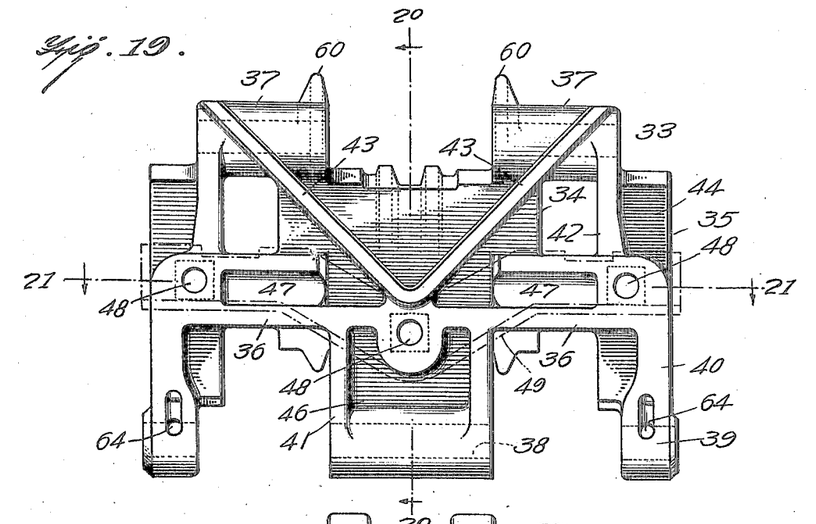
Fig. 19 is a bottom view of one of the tracks or lag plates.
Figures 20, 22:
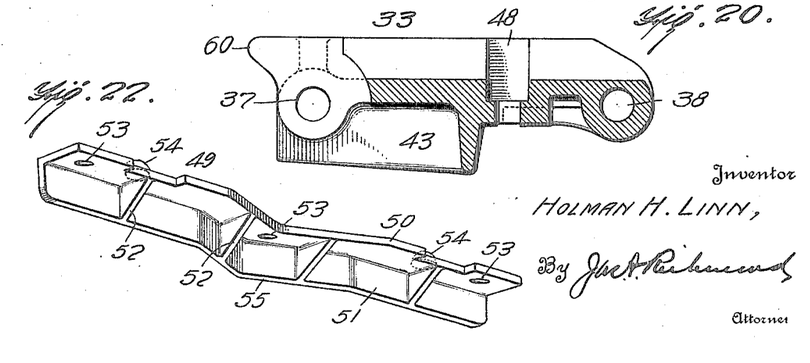
Fig. 20 is a section on line 20—20 of Fig. 19.
Fig. 22 is a perspective view of an emergency ice creeper.
Figure 21:
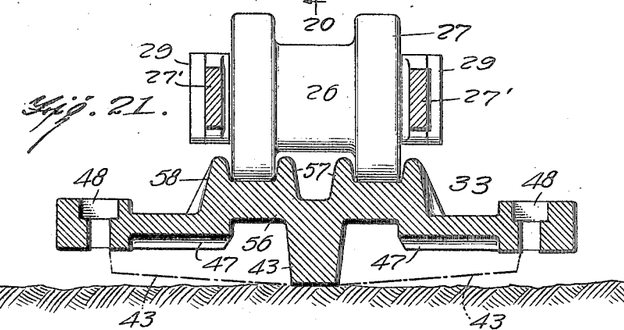
Fig. 21 is a sectional view of a lag plate with a roller in tracking relation.
Figure 23:
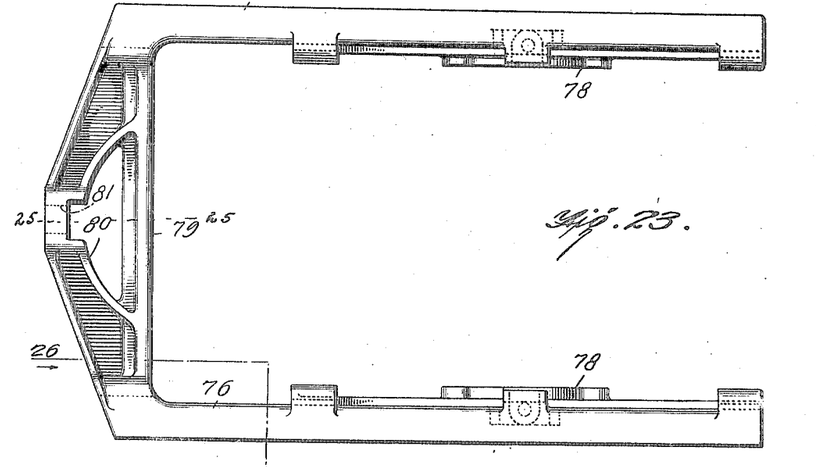
Fig. 23 is a plan view of the compensating slide for the idler sprockets.
Figure 24:
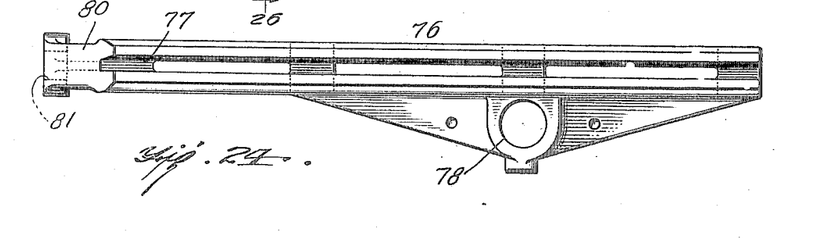
Fig. 24 is a side view thereof.
Figure 25:
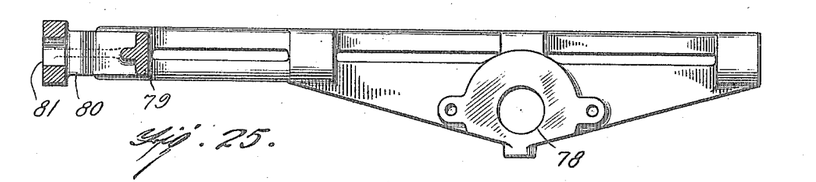
Fig. 25 is a section on line 25—25 of Fig. 23.
Figure 26:
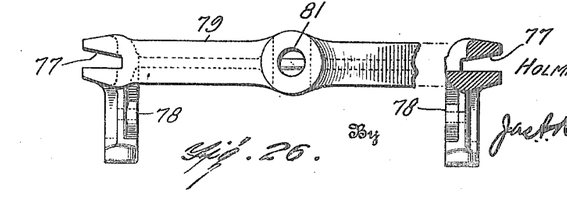
Fig. 26 is a section on line 26—26 of Fig. 23.

The self-laying track member, hereinafter referred to simply as the track, is made up of a plurality of linked lag plates of peculiar form. They are shown more particularly in Figs. 15 to 21 inclusive. The lag plates are substantially flat skeleton structures 33, having their ground contacting surfaces essentially interrupted, as hereinafter described in detail, to provide the necessary ground gripping or tractive properties. Each lag plate is a solid manganese steel casting of generally fork design, Fig. 19, including a main body portion 34 and spaced side elements 35 joined to the main body portion 34 by raised portions or ribs 36 and tubular terminals or eyes 37. At the opposite end, the main body portion 34 is formed with an eye 38, and the side elements are formed with eyes 39. It is a merit of the invention that the eyes 39 are buttressed by marginal right angle extensions 40 of the cross ribs 36; that the eye 38 is buttressed by longitudinal ribs 41 joining them to the cross ribs; and that the eyes 37 are buttressed by marginal ribs 42 branching from the cross ribs. The eyes 37 are further reinforced by a permanent grouser 43 consisting of a V shape offset, the apex of which is located about midway of the main body portion 34, and the arms of which extend to the remote corners of the eyes 37. To further provide for efficient gripping as well as to establish substantially uniform distribution of metal to insure uniform heat treatment of the casting, the side elements 35 are cut away at their forward end in line with the eyes 37, this reduction being external, as at 44, and tending to define the ribs 42; there is likewise at the other end an internal reduction 45, defining the rib 40 and stopping short of the eyes 39. So also, the main body portion 34 is embossed as at 46, between the cross ribs and the central eye 38; the cross ribs are slotted as at 47; and the permanent grouser is defined by its continuous or uninterrupted offset relation with surrounding depressed metal and by the gaps between it and the cross ribs. This permanent grouser is of greater depth than the ribs or other offset portions and its greatest depth is at its apex or in the central region of the body 34, the arms of the grouser gradually inclining towards the eyes 37. The main body portion 34 and the side elements 35 have bolt openings 48 in their ribbed or padded areas. Under adverse road conditions, as when encountering ice, provision is made to increase the grip of the lag plates through the use of readily attachable and detachable ice creepers 49, shown in dotted lines in Fig. 19 and in detail in Fig. 22. They are integral angle members embodying an attaching wall 50 and a gripping wall 51 reinforced by webs 52. The wall 50 has bolt holes 53, which register with the openings 48 of the lag plate, and bosses 54, which are accommodated in the slots 47 of the cross ribs. The creeper is bent as at 55 to adapt it to take a bearing against the permanent grouser, and this arrangement and the fact that the bosses 54 have a bearing in the lag plate operates to prevent or minimize thrust on the bolt connections.

The inner surface or floor of each lag plate, has a longitudinally ranging hump or raised portion 56 in the main body portion, which, in conjunction with identical sets of ribs 57 and 58, define parallel tracks or flange-ways for the flanges of the anti-friction rollers, the height of the ribs being so regulated that the spindles of the rollers are clear of or out of contact with the tracking area. It will be observed, upon reference to Fig. 21, that the construction and arrangement are such that side thrust of the rollers is absorbed on both sides of the respective roller flanges by the ribs 57 and 58. Upon reference to Fig. 16, it will be noted that the ends 59 of the ribs 57 and 58 overhang or extend beyond the floor portion of the lag plate in order to provide with the next adjoining plate a substantially intact or unbroken flange-way. The noses of the rib extensions are rounded, as at 60, to insure proper articulation. Evidently one of the characteristics of the lag plate of this invention is its lack of height and the way it hugs the ground. Since no load is suffered to be imposed upon the spindles of the rollers, there is no difficulty in excluding mud and grit, the ribs 57 and 58 operating efficiently as excluding elements notwithstanding that they are relatively close to the ground.

Figures 17, 18:
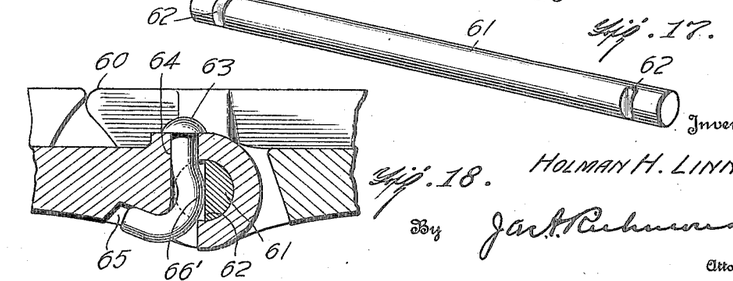
Fig. 17 is a perspective view of one of the lag pins.
Fig. 18 is a detail showing the method of securing the pin.

The eyes or hinge elements 37 of the lag plates are staggered with relation to the central eye 38 and complemental side eyes 39, to provide for proper linking of adjoining plates. In order to secure them in link formation, I prefer to employ link pins 61, so disposed as to be fully floating whereby shearing and undue wear are avoided. These pins, shown in detail in Fig. 17, are of a diameter to fit the eyes or hinge elements, and in length exceed the width of the plates. As shown in Figs. 17 and 18, each pin is provided near its ends with rounded slots 62 of the full diameter of the pin, for the reception of rivets 63, which are driven downwardly through openings 64 formed in the side elements of the lug plates and retained by deformation which causes them to hook into a bottom depression 65. The offset location of the opening 64, and its elongation, causes the rivet when driven to take a slight radius 66' with respect to the slot or recess 62. Accordingly, although the pins are held against endwise movement by the rivets, the latter have no restraining influence against limited rotary movement of the pins. Hence, the pins being full floating with respect to the connecting eyes a highly efficient and durable connection is afforded. It will also be observed with reference to the linking of adjoining plates that the area of bearing surface afforded the pin is equally distributed and substantially continuous, which further operates to prevent chafing or shearing of the pin.

The lag plates, when assembled in connected or track form, provide front and rear openings 66 and 67 on each side of the main body of the plate for the reception of sprocket teeth.

The tracks cooperate with sets of double sprockets whereof the rear sprockets 68 are driving sprockets, and the forward sprockets 69 serve as idlers. The latter are mounted for compensating movement to insure instant and complete responsiveness of the track to successive changes of ground surface.

Figures 1, 27, 28, 29, 30:
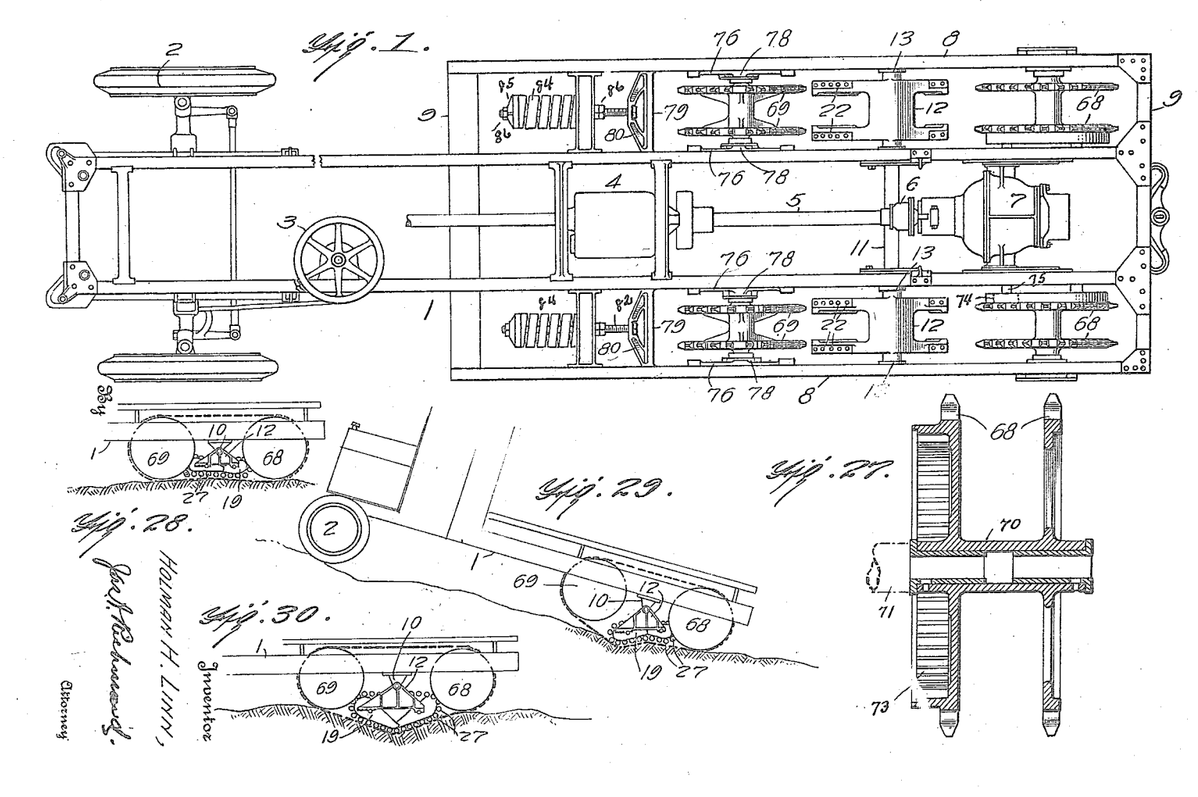
Fig. 1 is a plan view of the chassis, with certain elements, such as the power plant and tracks omitted.
Fig. 27 is a sectional view of a driving sprocket.
Figs. 28, 29 and 30 are diagrammatic views, graphically illustrating the complete flexibility of the tracks under irregular ground conditions.
Figure 2:
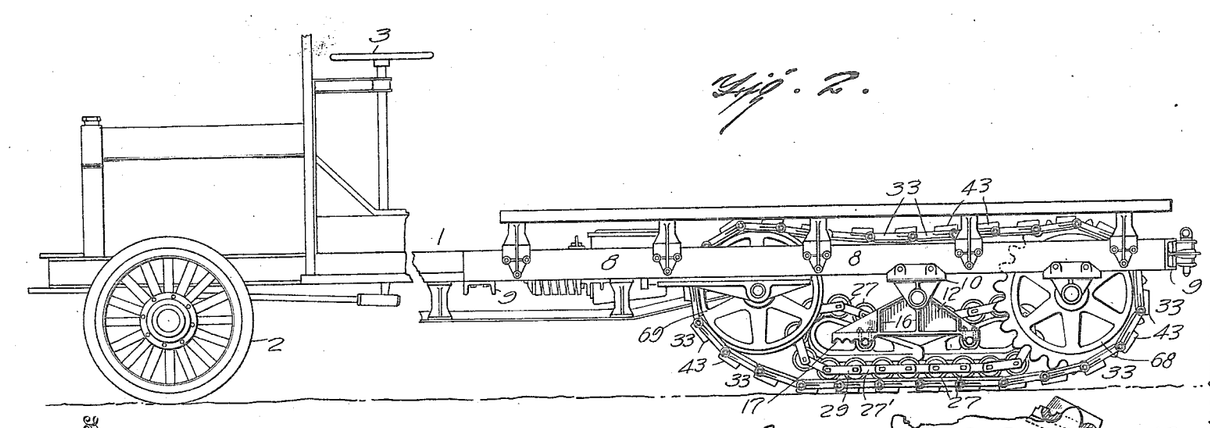
Fig. 2 is a side elevation of the tractor equipped with loading platform.
Figure 3:
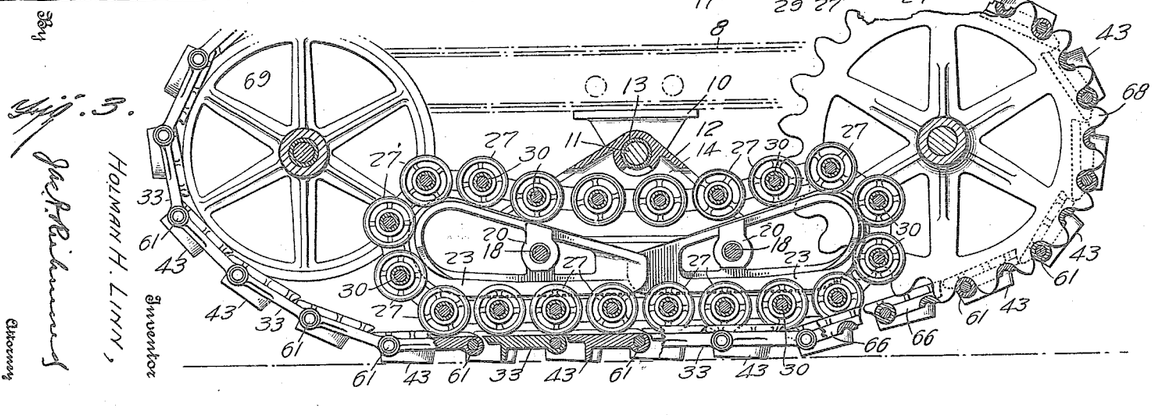
Fig. 3 is a sectional-elevational view of one of the tracks.
Figure 4:
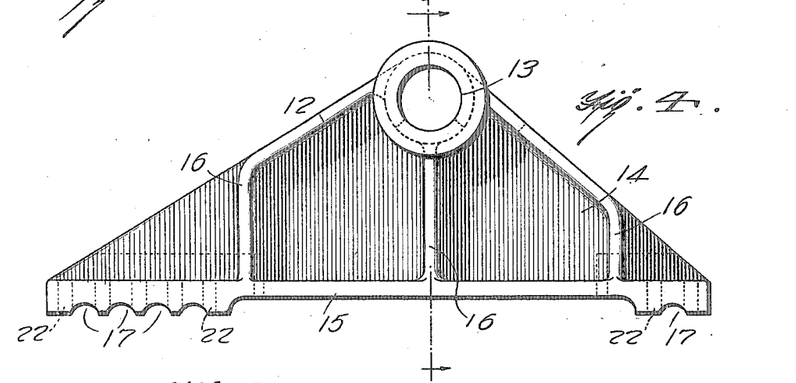
Fig. 4 is a side elevation of one of the rocker beams.
Figure 5:
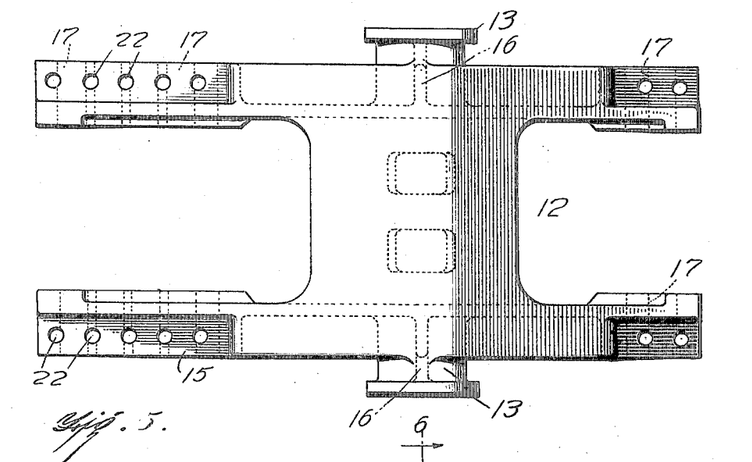
Fig. 5 is a plan view of the same.
Figure 6:
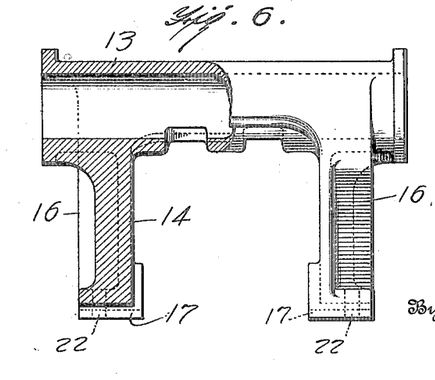
Fig. 6 is a section on line 6—6 of Fig. 4.
Figure 7:
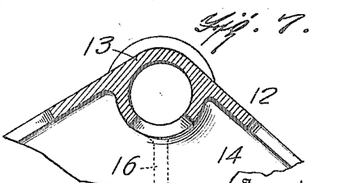
Fig. 7 is a transverse section of the pivot portion.
Figure 8:
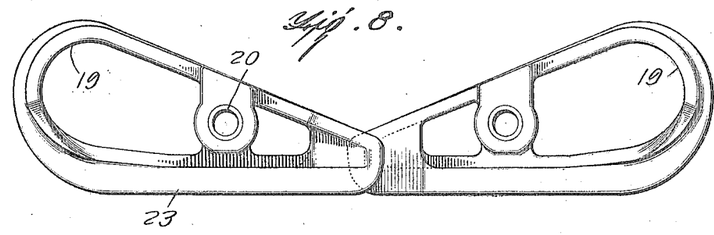
Fig. 8 is a view in elevation of the runner blocks, showing same in cooperative relation.

The driving sprockets 68 are coincident or twin spiders formed with a common hub 70 on an axle 71, supported in hangers on the main and auxiliary frame bars. The inner spider has a flange 72 constituting an internal or ring gear 73, in mesh with a driving pinion 74. The latter is secured on a jack shaft 75 mounted in bearings depending from the main frame. The jack shafts are of course operated in any appropriate manner through the differential 7, and thus the driving power is transmitted to the rear or driving sprockets of the track.

The forward or idler sprockets 69 are likewise of double spider construction. They are mounted in a compensating slide frame, yieldable under spring control to permit the idler sprocket to move toward the driving sprockets, to vary the tension of the lag-bed in accordance with varying ground surface conditions.

The slide frame, shown in detail in Figs. 23 to 26 inclusive, includes side bars 76, formed with channels 77 in their relatively outer side edges, to receive the main frame flange, to thereby permit sliding movement of the slide frame. The slide frame fits between the main and auxiliary frame bars and slidably cooperates with each, and its bars are equipped with bearings 78 to receive the idler sprocket shaft. The forward ends of the side bars are connected by a head 79. A guide section 80 is arranged in advance of the head and formed centrally with an opening 81, to receive a rod 82. The latter extends beyond the slide frame and through a bar 83 secured to and transverse to the main and auxiliary frame bars, and beyond the bar 83 passes through a strong coil spring 84, and is terminally provided with a head cap or disk 85 to bear on the end of the spring. The respective ends of the rod 82 are threaded for the reception of nuts 86, which provide for manual adjustment.

The slide frame, and thus the forward or idler sprockets are held in normal position by the spring 84, but are permitted to move rearwardly against the resistance of the spring under strain on the track.

The compensating slide carrying the idler sprockets permits the track to yield in order to overcome ground difficulties, without sacrifice of traction effort. It will be noted that the track underlies the rollers through the combined length of the runner blocks, and to the extent of this length the track has full bearing on the ground and thus traction in accordance with the weight of the load. This effective tractive length of the track is maintained under all operative conditions, but its characteristic line of application may be automatically varied by the ground surface. For example, referring to Figs. 28, 29, and 30, the different irregular ground surface conditions have resulted in responsive compensating movements of the rocker beam, the runner blocks on the rocker beam, and the rearward movement of the idler sprocket to provide the necessary increased ground contact of the track. These elements are thus automatically governed in movement by the character of surface with which the track engages at any particular moment, and in this compensation provide a perfectly flexible traction unit and more effort just when needed.

Referring again to the lag plates, it will be noted with respect to the permanent grouser that the apex of the V is directed towards the rear in the travel of the track. The merit of this is that it makes for tractive efficiency and for self cleaning because there is no tendency for it to pack, nor does it essay to push obstructions before it. Another advantage attendant on this construction is that it absolutely precludes side slipping on side hill work or on crowned roads.

The tracks are self-clearing in the event of "building up" conditions, namely, when rocks, ice, wet snow or other substances are trapped between the sprockets and tracks. Such conditions are overcome by the responsive action of the compensating slide which permits the sprockets to slip to forcibly eject the trapped material. Moreover, the instant responsiveness of the slide to permit slippage of the tracks will retard breakage due to conditions brought about through carelessness or ignorance of a "green" driver, as for example in bad going and in low gear, when he "steps on it."

The general design of the tractor, that is to say, its unusually long frame, with tracklaying drive at the rear and motor and steerage in front, gives in itself certain advantages. For example, it dispenses with steering clutches, steering brakes and their controls. Full power is available on sharp turns. Both tracks drive around a turn and thus avoid cutting up the ground. The suspension is such that no weight is carried on any axle or axle bearing in the rear drive.

The tracks may be said to be universal in that they are suited to all conditions of terrain, no special grousers or mud hooks being necessary. They are flexible to the greatest possible extent, a feature very essential to maximum performance under varying conditions because it affords the tracks full contact with the ground at all times and prevents loss of potential pull. The compensating slide contributes to the flexibility of the track by permitting it to take up freely on uneven surfaces. It maintains proper track tension for any surface and takes up wear automatically.

Finally, it is a merit of the invention, that the components of the lag-bed, the rollers and their side bars and half bushings, the driving and idler sprockets, the emergency creepers and the runner blocks, and other elements subject to heavy duty service involving shock and wear are constructed of high per cent cast manganese steel, and substantially uniform sections are provided to ensure proper heat treatment. For example, the flanges of the rollers, which must be especially resistant to shock and wear, are recessed as at 87, to provide for uniformity of section, the recess being interrupted by webs 88, which avoid undesirable unsupported overhang of the flanges.

Having described the nature and objects of my invention and the manner in which the same is to be performed, I claim :—

1. A traction unit having, in combination, a flexible track and its complemental supports and a system of load transmitting elements, including an axle-hung rocker beam and runner blocks on which it is superimposed, the runner blocks being capable of relative endwise adjustment and having their confronting ends overlapping.

2. A traction unit having, in combination, a flexible track and its complemental supports, and a system of load transmitting elements, including an axle-hung rocker beam and runner blocks on which it is superimposed, the rocker beam having bottom half caps or bearings to establish rocking engagement of the runner blocks.

3. A traction unit having, in combination, a flexible track and its complemental supports, and a system of load transmitting elements including an axle-hung rocker beam and wedge shaped solid runner blocks on which it is superimposed, the runner blocks having each a central longitudinally ranging rib and flanged rollers cooperating with said ribs and track and affording an orbital path of movement between the track and runner blocks, the construction and arrangement being such that no weight is imposed upon the spindles of the rollers.

4. A traction unit having a self-laying track, a roller bearing for the track, and runner blocks with which said bearing cooperates, said blocks having mitered ends and being relatively adjustable.

5. A traction unit including a rocker beam, runner blocks pivotally mounted and adjustably connected in such beam and having a defined rib or trackway, a roller bearing traveling over such blocks and having a portion to cooperate with the trackway on the blocks, and a self-laying track engaging a trackway portion of the roller bearing of a diameter varying from that of the roller bearing engaging the runner blocks.

6. A tractor of the front steerage type equipped with traction units each having, in combination, an endless track of the flexible type, means for loading the track and including pyramided elements capable of vertical rocking movement, a connected series of flanged rollers between said means and the track and afforded an orbital path of movement over mated rocking elements, said track embodying articulated lag plates having provisions for supporting the rollers by their flanges and not otherwise.

7. The combination with the tracks and runner blocks providing a differential roller path, of hollow rollers of the flange type, side bars having half bushings for the rollers and means for maintaining the assembly comprising links and pins penetrating the bushed rollers and button-headed in the links.

8. The combination with the tracks and runner blocks providing a differential roller path, of rollers of the hollow spindle flange type, the roller flanges having overhangs buttressed by radial webs.

9. A pair of runner blocks each equipped with means whereby it may be suspended for vertical rocking movement and each having a bottom rib constituting a roller path, said runner blocks having tapered noses in overlapping relation to permit articulation of the blocks without interrupting the continuity of the roller path.

10. A rocker beam having a sleeve-like supporting element with depending side walls, the bottoms of which have depressions constituting half cups or bearings.

11. A rocker beam having an off center sleeve-like supporting element, with spaced depending side walls, the bottoms of the latter having depressions, and the ledges of the walls being pierced for the reception of retaining means.

12. In a tractor equipped forwardly with steerage provisions and with a power plant and equipped rearwardly with traction units and with a final drive for propelling the same, the combination of a load carrying platform above the traction units, articulated load transmitting elements between the traction units and said platform, said traction units having flangeways and said load transmitting elements having ribs and rollers having flanges adapted to said flangeways and spindles adapted to said ribs.

In testimony whereof I affix my signature.

HOLMAN HARRY LINN.